United States Patent [19]

Ullah

[11] Patent Number: 5,626,347
[45] Date of Patent: May 6, 1997

[54] CONING RESISTANT FACE SEAL HAVING A "U" SHAPE

[75] Inventor: M. Rifat Ullah, Phoenix, Ariz.

[73] Assignee: AlliedSignal Inc., Morristown, N.J.

[21] Appl. No.: 597,572

[22] Filed: Feb. 2, 1996

Related U.S. Application Data

[63] Continuation of Ser. No. 314,753, Sep. 29, 1994, abandoned.

[51] Int. Cl.$^6$ ..................................................... F16J 15/34
[52] U.S. Cl. ........................ 277/96.1; 277/81 R; 277/91
[58] Field of Search ................................... 277/81 R, 96.1, 277/38, 39, 83 R, 93 R, 96, 91

[56] References Cited

U.S. PATENT DOCUMENTS

| | | | |
|---|---|---|---|
| 2,586,739 | 2/1952 | Summers | 277/93 R |
| 2,761,712 | 9/1956 | Ecker | 277/91 |
| 2,802,679 | 8/1957 | Taltavall | 277/81 R |
| 2,992,842 | 7/1961 | Shevchenko et al. | 277/81 |
| 4,087,097 | 5/1978 | Bossens et al. | 277/83 |
| 4,415,165 | 11/1983 | Martini | 277/81 R |
| 5,024,451 | 6/1991 | Borowski | 277/53 |
| 5,183,270 | 2/1993 | Alten et al. | 277/81 R |

FOREIGN PATENT DOCUMENTS

| | | | |
|---|---|---|---|
| F135660I | 10/1955 | Germany | 277/81 R |
| 1751564 | 7/1992 | Russian Federation | 277/81 R |
| 1213296 | 3/1986 | U.S.S.R. | 277/96.1 |
| 1643834 | 4/1991 | U.S.S.R. | 277/96.1 |

Primary Examiner—Daniel G. DePumpo
Attorney, Agent, or Firm—Jerry J. Holden; James W. McFarland

[57] ABSTRACT

A face seal comprising an annular carbon stator having a flat sealing surface in rubbing contact with a flat sealing surface of an annular metallic rotor. The rotor has a head portion connected to a base portion by a neck portion, that is disposed on the same side of the rotor as the rotor's flat sealing surface. The neck portion has two straight radial surfaces, and is disposed on the same side of the rotor as the rotor's flat sealing surface. The formation of adverse thermal gradients within the rotor can be avoided by adjusting the axial thickness of the neck portion, thereby preventing coning of the rotor.

5 Claims, 1 Drawing Sheet

CONING RESISTANT FACE SEAL HAVING A "U" SHAPE

This application is a continuation of application Ser. No. 08/314,753 field Sep. 29, 1994 now abandoned.

TECHNICAL FIELD

The present invention relates generally to sealing devices and in particular to face seals used in gas turbine engines.

BACKGROUND OF THE INVENTION

Face seals are used in gas turbine engines to prevent the leakage of fluid along rotating shafts where the shaft extends through a stationary structure such as a wall or partition. Referring to FIG. 1, a typical face seal is comprised of a stationary stator 22, having a flat surface that rubs against a flat surface of a rotating rotor 20. The rubbing of these surfaces generates significant amounts of heat and as a result thermal gradients within the rotor 20 form. These gradient must be properly managed to prevent leakage. A problem that can arise with rotors having the shape of rotor 20 is that under adverse thermal gradients rotor 20 will deform or cone. When this occurs the flat surface of the rotor 20 swings away from the flat surface of the stator 22 resulting in leakage.

One approach to this problem has been is to provide external or internal cooling of the rotor in the form of oil jets, cooling fins, or cooling passages. However, these approaches add significant complexity to the design of the rotor and are expensive. Another approach has been to make the rotor from a ceramic. A disadvantage to ceramics is their brittleness.

Accordingly, there is a need for a face seal having a rotor configured to be resistant to deformation when subjected to adverse thermal gradients.

SUMMARY OF THE INVENTION

An object of the present invention is to provide a face seal having a rotor configured to resist deformation when exposed to adverse thermal gradients.

Another object of the present invention is to provide a face seal with a simple design that can be made from conventional metals.

The present invention achieves this objective by providing a face seal comprising an annular stator having a flat sealing surface in rubbing contact with a flat sealing surface of an annular rotor. The rotor includes a head portion, having the flat sealing surface, and a base portion for transmitting a clamping force. A radially extending neck portion extends from the head portion to the base portion, and is disposed on same axial side of the rotor as the rotor's flat sealing surface. The axially facing walls of the neck portion are straight and the thickness of the neck portion is sufficiently less than the thickness of the head and base portions so as to define an annular groove therebetween.

DESCRIPTION OF THE PREFERRED EMBODIMENT

Figure 1:
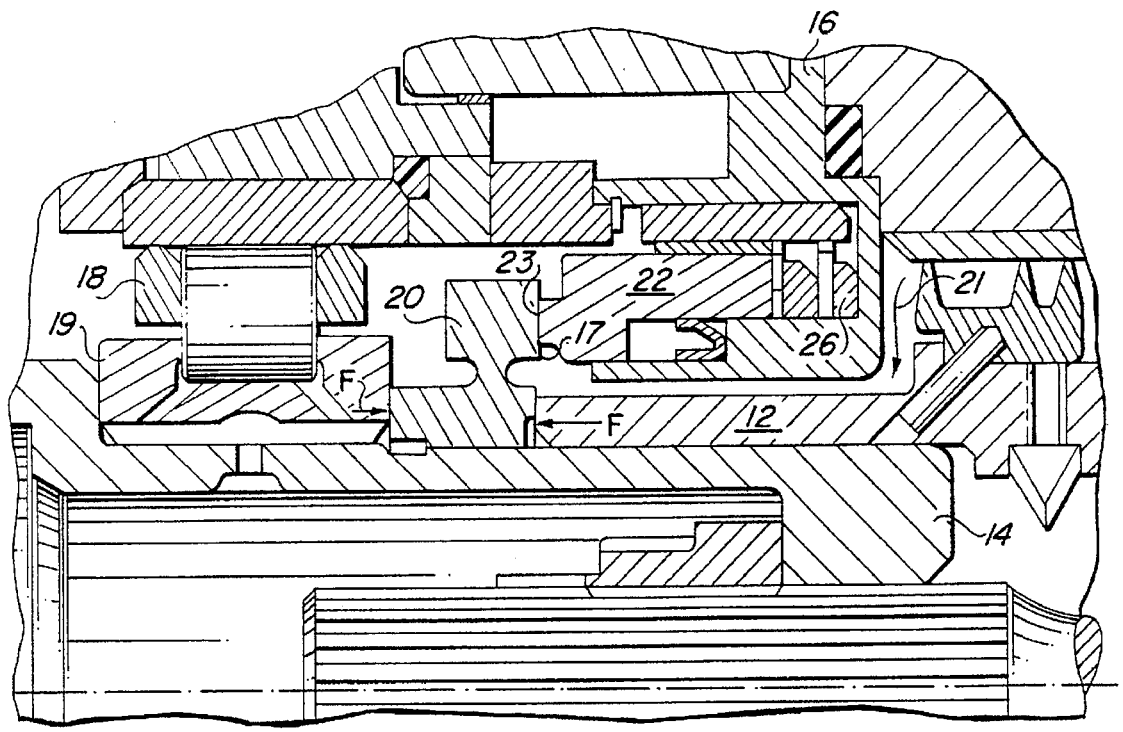
FIG. 1 is a cross-sectional view of a gas turbine engine having a conventional face seal.

Referring to drawings, FIG. 1 shows a compressor section of a gas turbine engine generally denoted by the reference numeral 10. The compressor 10 has a rotating compressor disk 12 coupled to the rotating shaft 14. Circumscribing the shaft 14 is a stationary housing 16. The housing 16 is mounted atop a bearing 18 having an inner race 19 which is mounted on the shaft 14. A conventional, annular metallic seal rotor 20 is mounted for rotation on the shaft 14 and has a base portion that abuts at one axial end the inner race 19 and at the other axial end the compressor disk 12. A portion of the housing 16 circumscribes a portion of the compressor disk 12 defining a leakage path, referenced by arrow 21. Mounted within the housing 16 is a conventional, annular carbon stator 22 that has a flat surface 23 that is in rubbing contact with a flat surface 17 of the rotor 20. The surfaces 17 and 23 are flat as manufactured to within three helium light bands which is about 0.000040 inches. A spring 26 forces the surfaces 17 and 23 together to seal the leakage path 21. Due to the manner of engine assembly, a compressive, clamping force, represented by arrows F, is transmitted through the base portion of the rotor 20.

Figure 2:
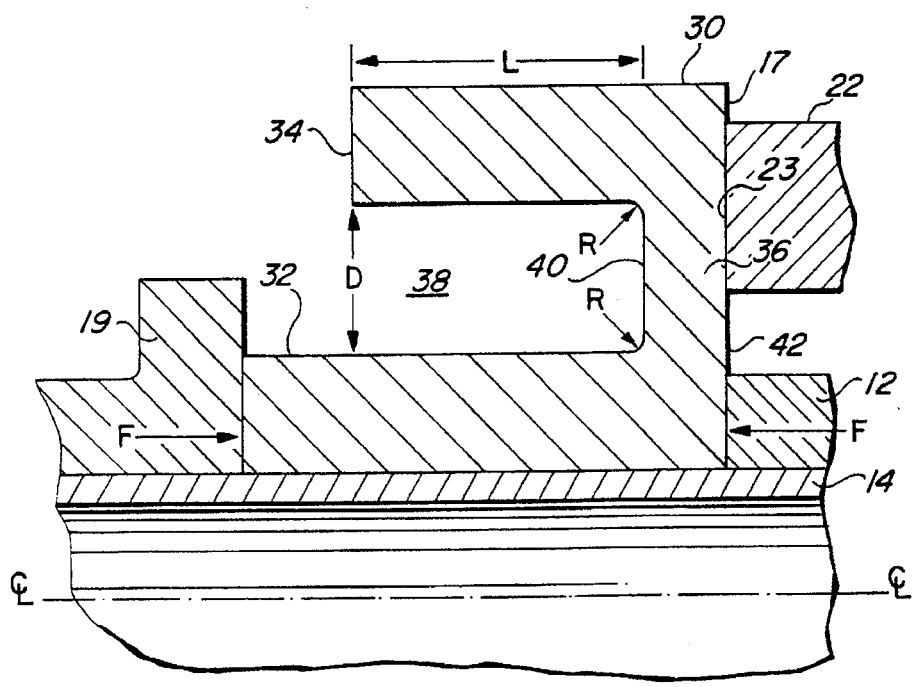
FIG. 2 is a cross-sectional view of the face seal contemplated by the present invention.

In the preferred embodiment, the rotor 20 is replaced with an annular, metallic rotor 30 as shown in FIG. 2. The rotor 30 has a base portion 32 connected to a head portion 34, by a neck portion 36. Like the head portion of rotor 20, the head portion 34 has a flat sealing surface 17 for rubbing against the flat sealing surface 23 of the stator 22. The neck portion 36 is integral with both the head and base portions, and has two straight, radial surfaces 40, and 42. To avoid stress concentrations, the surface 40 is curved at the points where it meets the head and base portions. Importantly, the neck portion 36 must be on the same axial side of the rotor 30 as the flat sealing surface 17. In a manner familiar to those skilled in the art, the axial thickness of the neck portion 36 is determined using finite element analysis so that for a particular thermal gradient there is either none or an acceptable amount of deformation or coning of the flat sealing surface 17. Generally, this thickness should be between 0.030 inches and 0.050 inches and sufficiently less than the axial thickness of the head and base portions so as to define an annular channel 38 having an axial length L and a radial width D. Preferably, the ratio of L/D is less than or equal to 2. The base portion 32 transmits the clamping force F and the ratio of the axial thickness of the base portion 32 to the axial thickness of the head portion 34 is preferably less than or equal to 2.

It is believed that coning is linked to local thermal gradients in the rotor, and is independent of actual temperature levels. The Applicant has discovered that these thermal gradients are a function of the rotor's geometry and in particular are sensitive to the thickness of the neck portion when the neck portion is on the same side of the rotor where heat is generated and is bounded by straight surfaces. Thus, adverse thermal gradients, which cause excessive coning, can be avoided by adjusting the thickness of the neck portion. The result is a simple face seal that is easy inexpensive to manufacture, can be made from conventional materials, and can easily be configured to withstand coning deformation.

Though the preferred embodiment has been described in the context of a compressor, the present invention can be used to seal between any rotating shaft and a stationary housing. Various modifications and alterations to the above described preferred embodiment will be apparent to those skilled in the art. Accordingly, this description of the invention should be considered exemplary and not as limiting the scope and spirit of the invention as set forth in the following claims.

What is claimed is:

1. A face seal comprising:

an annular carbon stator having a first flat, sealing surface; and an annular metal rotor, said rotor having a head portion connected to a base portion by a neck portion, said annular rotor further including a second flat surface a portion of which is in sealing contact with said first sealing surface, said base portion adapted for direct mounting to an axially extending rotating shaft and extending a first distance from said second flat surface, said head portion extending a second distance from said second flat surface in the same direction as said base portion, and said neck portion extending a third distance from said second flat surface in the same direction as said base and head portions, said third distance being less than said first and second distances thereby defining an annular groove bounded by said base, neck, and head portions and having an axial length greater than said third distance.

2. The face seal of claim 1 wherein said first and second flat surfaces are axially facing.

3. The face seal of claim 2 wherein the ratio of said axial length of said groove to its radial width is at most 2.

4. The face seal of claim 1 wherein the ratio of said first distance to said second distance is at most 2.

5. The face seal of claim 1 wherein the portion of said second flat surface from which said base portion extends does not contact said annular stator.

* * * * *